United States Patent
Hunke et al.

(10) Patent No.: US 7,748,682 B2
(45) Date of Patent: Jul. 6, 2010

(54) PEDESTAL STAND FOR A LAUNDRY TREATMENT MACHINE

(75) Inventors: Klaus Hunke, Gütersloh (DE); Jörg Kempe, Gëtersloh (DE)

(73) Assignee: Miele & Cie. KG, Gutersloh (DE)

( * ) Notice: Subject to any disclaimer, the term of this patent is extended or adjusted under 35 U.S.C. 154(b) by 343 days.

(21) Appl. No.: 11/594,395

(22) Filed: Nov. 8, 2006

(65) Prior Publication Data

US 2007/0102618 A1    May 10, 2007

(30) Foreign Application Priority Data

Nov. 8, 2005    (DE)    ........................ 10 2005 053 554

(51) Int. Cl.
*F16M 11/00*    (2006.01)
(52) U.S. Cl. .................. 248/678; 248/673; 248/346.05; 312/351.2; 312/351.7
(58) Field of Classification Search ............. 312/330.1, 312/223.1, 351.2, 351.7; 248/673, 678, 188.4, 248/346.05, 346.03
See application file for complete search history.

(56) References Cited

U.S. PATENT DOCUMENTS

| | | | | |
|---|---|---|---|---|
| 2,931,128 A | * | 4/1960 | Kanzelberger et al. | ... 248/188.4 |
| 3,096,781 A | * | 7/1963 | Roidt | ........................ 137/314 |
| 3,436,045 A | * | 4/1969 | Anspaugh | .................... 410/46 |
| 5,957,557 A | | 9/1999 | Langer et al. | |
| 6,155,527 A | * | 12/2000 | Muyskens | ............... 248/346.03 |
| 6,327,985 B1 | * | 12/2001 | Frenkler et al. | ......... 108/147.19 |
| 6,427,966 B1 | * | 8/2002 | Blumenschein | ............. 248/678 |
| 6,585,225 B1 | * | 7/2003 | Lake | .......................... 248/678 |
| 6,923,419 B2 | * | 8/2005 | George et al. | ............... 248/676 |
| 7,267,309 B2 | * | 9/2007 | Hanson | .................... 248/188.4 |
| 7,281,775 B2 | * | 10/2007 | Yang | ....................... 312/348.1 |
| 2004/0263032 A1 | * | 12/2004 | Cho | ........................ 312/330.1 |
| 2005/0241344 A1 | | 11/2005 | Graute et al. | |

FOREIGN PATENT DOCUMENTS

| | | |
|---|---|---|
| DE | 3213420 | 10/1983 |
| DE | 20302572 | 5/2003 |

OTHER PUBLICATIONS

European Patent Office, Abstract of DE3213420.
European Patent Office, Abstract of DE20302572.

* cited by examiner

*Primary Examiner*—J. Allen Shriver, II
*Assistant Examiner*—Bradley H Duckworth

(57) ABSTRACT

The invention relates to a pedestal stand for a laundry treatment machine (1) such as a washing machine, a washer dryer or a tumble dryer, having a housing (3) which comprises a supporting plate (6), side walls (5), front frame (25) [sic; (26)] and a rear wall plus a bottom plate (8) with bearing feet (9), whereby the supporting plate (6) has holes (12) into which threaded stud bolts (11) attached to the underside of the laundry treatment machine (1) can be inserted and screwed down. Within the housing (3), a stud bolt (14) is arranged on the essentially vertical axis (A) between the openings (12) in the supporting plate (6) and the bearing feet (9) on the bottom plate (8) of the housing (3).

20 Claims, 4 Drawing Sheets

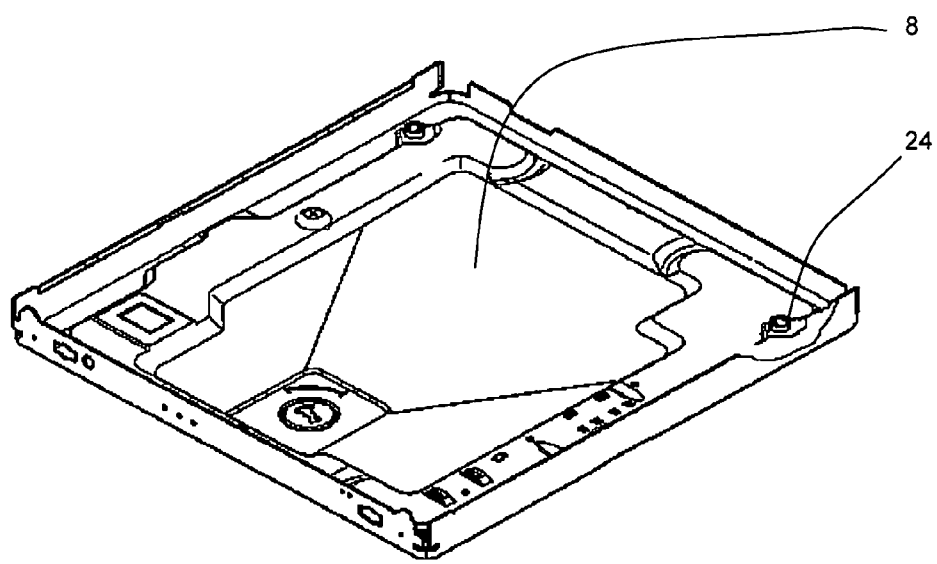
Fig. 4
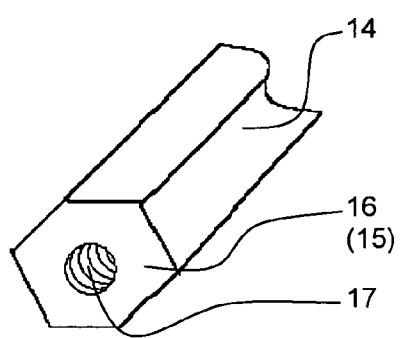 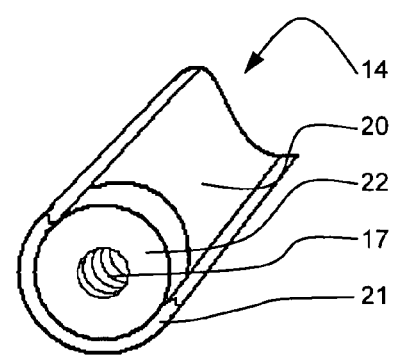
Fig. 5  Fig. 6

PEDESTAL STAND FOR A LAUNDRY TREATMENT MACHINE

FIELD OF THE INVENTION

The invention relates to a pedestal stand for a laundry treatment machine such as a washing machine, a washer dryer or a tumble dryer having a housing which comprises a supporting plate, side walls, front frame and a rear wall plus a bottom plate with bearing feet, whereby the supporting plate has holes into which threaded pins attached to the underside of the laundry treatment machine can be inserted and screwed down.

BACKGROUND OF THE INVENTION

DE 10 2004 022 023 B3 describes a pedestal in the form of a box-shaped substructure on which a laundry treatment machine can be arranged. In this way, with this machine the working height can be increased, thereby yielding an ergonomic improvement for the user.

DE 203 02 572 U1 also discloses a pedestal for a washing machine, said pedestal having a drawer. In this case, the edges and corner areas of the surfaces are designed as U-sections or square pipes to ensure the required stability.

DE 196 31 639 A1 discloses a system comprising stackable kitchen appliances and kitchen furniture. In this case, tubular reinforcements are inserted in the corner areas, defining the coupling points with the next appliance or furniture part.

The aforementioned pedestal stands may provide the required stability to hold a laundry treatment appliance, even a washing machine weighing more than 100 kilograms, for example, but they are hardly capable of absorbing the dynamic forces that occur with such a washing machine during a wash cycle or spin cycle. In the event of forces introduced due to an unbalanced load, a spring movement at the supporting points for the laundry treatment machine is unavoidable. For this reason, the possible adjustable rotational speeds for the spin cycle have been limited in some cases.

DE 32 13 420 A1 discloses a pedestal stand comprising a frame having a supporting plate. The frame has two bearing legs, each pointing toward the floor with a common cross strut on each of two sides. The two cross struts arranged at a distance from one another form the bearing feet. To be able to withstand high forces and/or to divert them toward the ground, the bearing legs and the frame must be designed to be stable. There is thus the risk that the bearing legs might be able to shift and/or move like a parallelogram. The support of the washing machine bearing feet on the supporting plate is provided on the outer edge of the supporting plate whereby the outer edge protrudes above the edge.

SUMMARY OF THE INVENTION

The problem on which the present invention is based is thus to provide a pedestal stand for a laundry treatment machine which is simple to install on the one hand, while on the other hand, ensuring an improved standing behavior.

According to this invention, this problem is solved by a pedestal stand having the features described in claim 1. Preferred embodiments and refinements of the invention are derived from the following dependent claims. The advantages that can be achieved with the invention are derived from, inter alia, the fact that a pedestal stand having very stable standing behavior is made available by using simple means. Another advantage is that existing pedestal stands can be subsequently upgraded easily with regard to their stable standing behavior. This utilizes the surprising finding that the greatest force component in an unbalanced load case is directed perpendicularly downward. To divert this very high force component away from the machine to the floor in particular, stud bolts are arranged inside the housing, aligned with the essentially vertical axis between the openings in the supporting plate and the bearing feet on the bottom plate. The forces caused by the laundry treatment machine need no longer be diverted via the housing of the pedestal to the bearing foot. The vertical force component of all forces occurring is transmitted through the essentially vertically arranged stud bolts to the bearing foot and/or bearing feet by the shortest path. Owing to the vertical or almost vertical arrangement of the stud bolts, bending or twisting is ruled out. The spring action of the pedestal is completely eliminated. Another advantage of the invention is that the thickness of the sheet metal for the pedestal housing can be reduced in comparison with the known pedestal stands, which permits savings in terms of material.

In a preferred embodiment, the stud bolts arranged between the supporting plate and the pedestal plate are provided with a threaded bore on the top side. Threaded pins of the laundry treatment machine are screwed into these threaded bores, whereby the housing of the laundry treatment machine is resting on the supporting plate. This ensures that the stud bolt is bolted to the supporting plate and also to the laundry treatment machine.

In another preferred embodiment, the stud bolts are each provided with a threaded bore on their lower ends. The bearing feet have a threaded stud bolt aligned perpendicular to the supporting surface, each threaded stud bolt being inserted through openings in the bottom plate of the pedestal stand and screwed into the lower threaded bore in the stud bolt. This creates a direct and stable connection between the washing machine housing and the bearing feet. The bearing feet are screwed from the outside and/or from the underside of the pedestal into the stud bolts, so that assembly of the bearing feet and the height adjustment and/or alignment of the entire arrangement can be performed in the usual manner. Since the stud bolts each rest with their undersides on the inside of the bottom plate, a very tight connection between the bearing feet of the pedestal and the housing of the laundry treatment machine is created.

In another preferred embodiment, each stud bolt has a square shape or a hexagonal shape on its outside circumference at least in an axial section. This outer shape offers the possibility of attaching a tool to rotate the stud bolt and perform the screw connection.

In a preferred embodiment, the stud bolt is made of a solid metallic material. The threaded bores are designed as blind holes ending in the ends of the respective stud bolt.

In an alternative embodiment, the stud bolt is made of a pipe. The threaded bores in the pipe ends are formed by threaded sleeves or lock nut that are fixedly inserted. Pressing or welding of the threaded sleeves to the pipe ends are recommended.

In another preferred embodiment, the stud bolt has a shoulder on its lower end which is inserted into the opening ending in the bottom plate. The shoulder has essentially a shape corresponding to the opening, with which the stud bolt engages in the opening and is secured there. This further improves the connection between the stud bolt and the bottom plate.

It is also advantageous to insert sleeves into the openings in the bottom plate and/or into the openings in the supporting plate, these sleeves provide the opening for the threaded stud bolts and provide a support for the stud bolts together with the supporting surface which protrudes out of the plane. This prevents any friction of the stud bolts and/or the threaded stud bolts on or in the sheet metal, which additionally increases the stability and handling of the pedestal stand.

BRIEF DESCRIPTION OF THE DRAWINGS

An exemplary embodiment of the invention is illustrated purely schematically in the drawings and described in greater detail below.

FIG. 4 shows the bottom plate of the pedestal as a detail;

FIGS. 5 and 6 show the stud bolts as a hex head stud bolt and as a pipe, respectively;

DETAILED DESCRIPTION OF THE INVENTION

Figure 1:
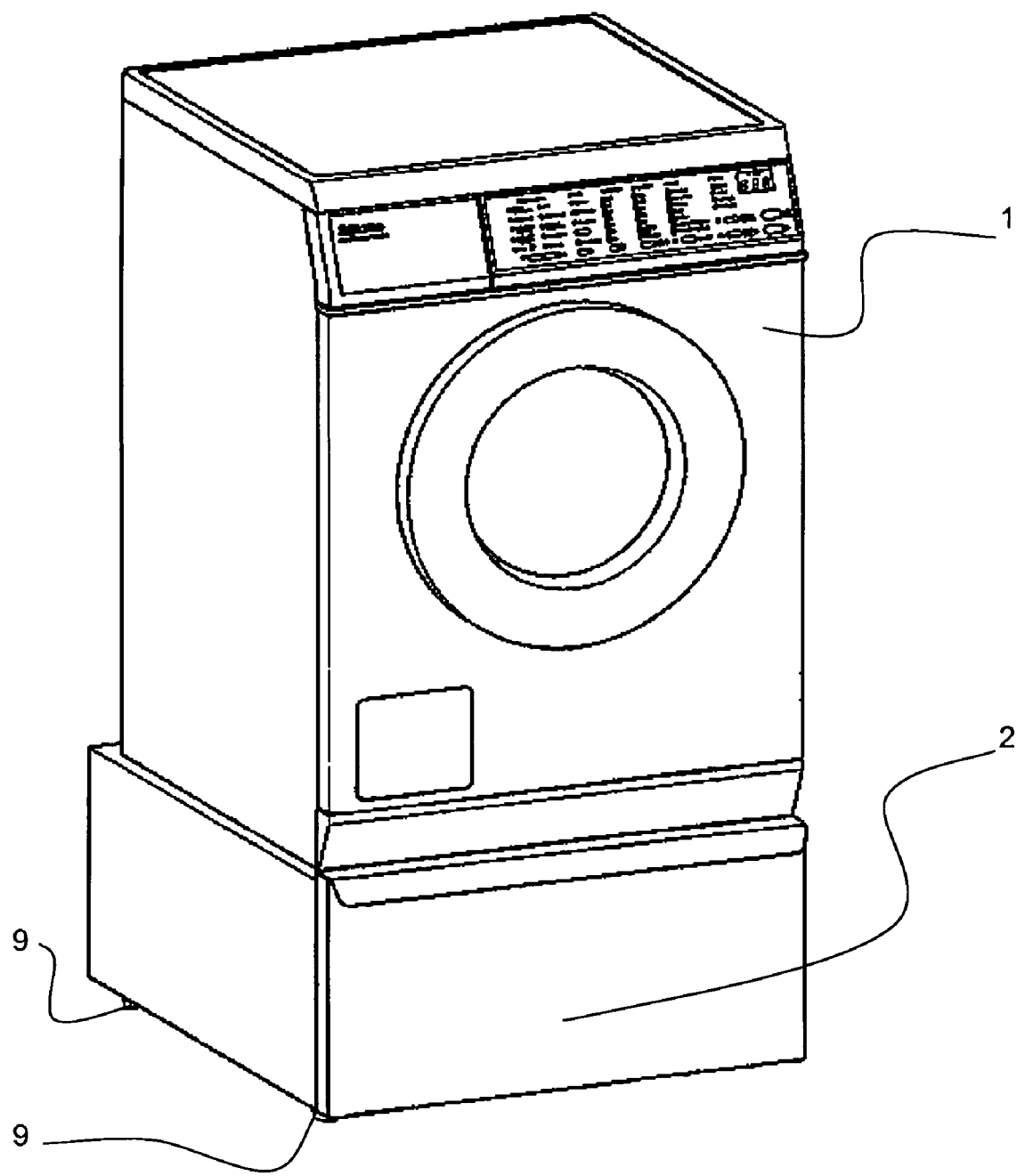
FIG. 1 shows an overall view of a pedestal stand with a washing machine placed upon it.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 8 in particular, the pedestal stand of the present invention is disclosed.

The household washing machine 1 illustrated in FIG. 1 is placed on a pedestal stand 2 and connected to it in a manner to be described below.

Figure 2:
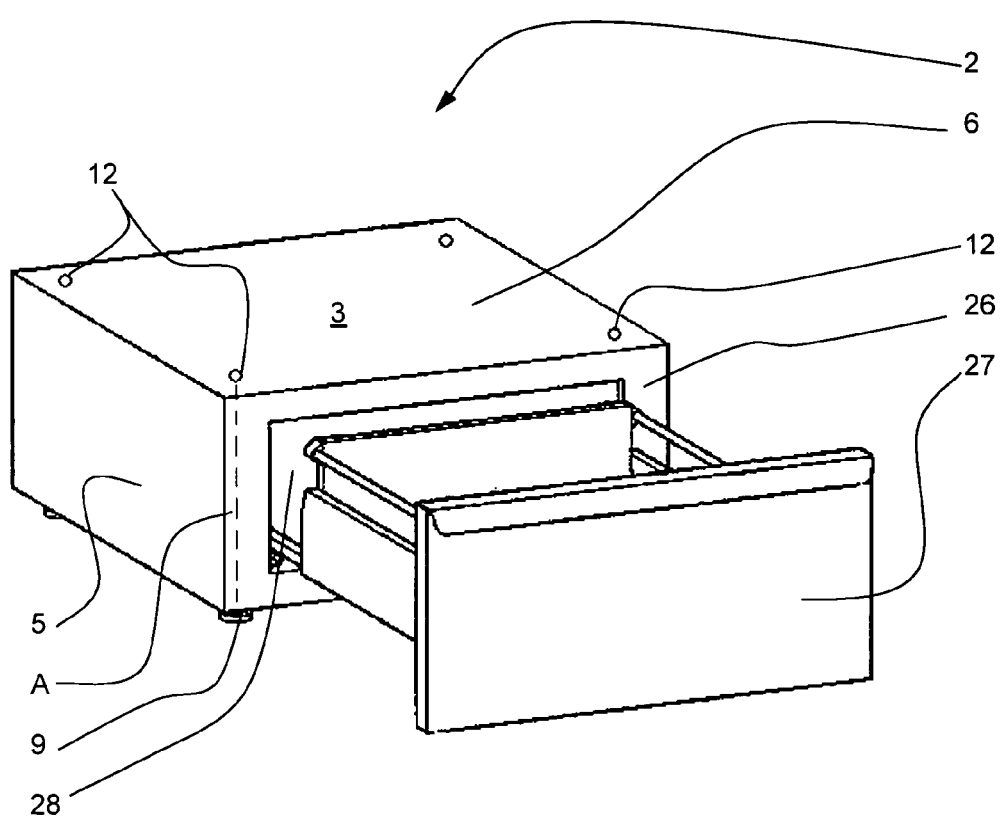
FIG. 2 shows the pedestal stand in a perspective view.
Figure 3:
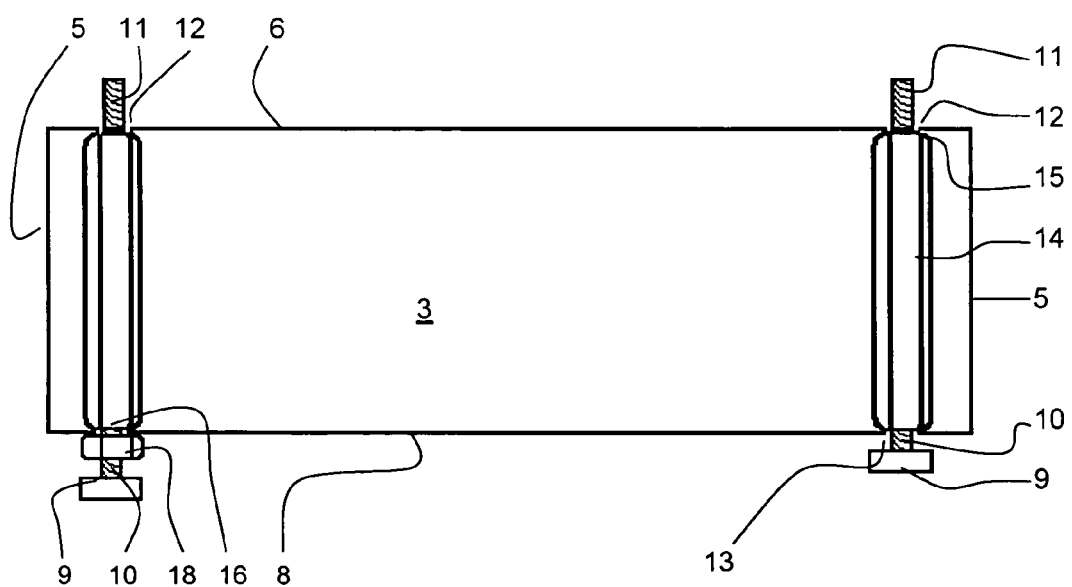
FIG. 3 shows the pedestal stand in a sectional view.

As shown in FIGS. 1 through 3, the pedestal stand 2 includes a housing 3 which comprises a body with a bottom plate 8 and bearing feet 9 arranged on the bottom plate 8. The body is a one-piece part which forms the two side walls 5 and the supporting plate 6 for the washing machine 1. This part is also first cut from a coil by punching and provided with holes 12 which are used for mounting the washing machine 1. The body is closed on the back side by screwing a rear wall (not shown here) onto it. The front is formed by a frame 26 which provides an opening 28 for a flap or a drawer 27. The axis A, shown with a dotted line on the front left corner of the housing 3, forms the shortest connection between the hole 12 and the bearing foot 9.

FIG. 3 shows the position of the stud bolts 14 inside the housing 3. The stud bolts 14 are each arranged between a hole 12 in the supporting plate 6 and a hole 13 in the bottom plate 8. For installing the washing machine 1 on the pedestal stand, the bearing feet 9, which are normally bolted to the bottom plate of the washing machine 1 are released there and replaced by threaded stud bolts 11. The washing machine 1 is then placed in the corresponding holes 12 in the supporting plate 6 with threaded stud bolts 11. For connecting the washing machine 1 and the pedestal 2, the stud bolts 14 are screwed in the interior of the housing 3 onto the threaded pins 11 until they are in contact with the inside of the supporting plate 6 on their upper end 15. This is true similarly for all threaded stud bolts 11 screwed to the underside of the washing machine 1. Then, the bearing feet 9 with their threaded stud bolts 10 are inserted through the respective hole 13 in the bottom plate 8 and are bolted to the lower end 16 of the stud bolt 14. This is true by analogy for all the bearing feet 9. With the help of the lock nut 18, bearing foot 9 is secured in its height and a tight connection between the bottom plate 8 and the stud bolt 14 is also achieved.

As illustrated in FIG. 5, the stud bolt 14 has a threaded bore 17 in axial alignment on its ends 15, 16. If the stud bolt 14 is made of a solid metallic material, the threaded bores 17 are each designed as blind holes. The hexagonal shape offers a good opportunity for attaching a tool for assembly purposes. An alternative embodiment is illustrated in FIG. 6. A pipe assumes the function of the previous stud bolt 14, whereby a threaded sleeve 22 or a lock nut is fixed, pressed or inserted and welded into the pipe ends 21.

Figure 7:
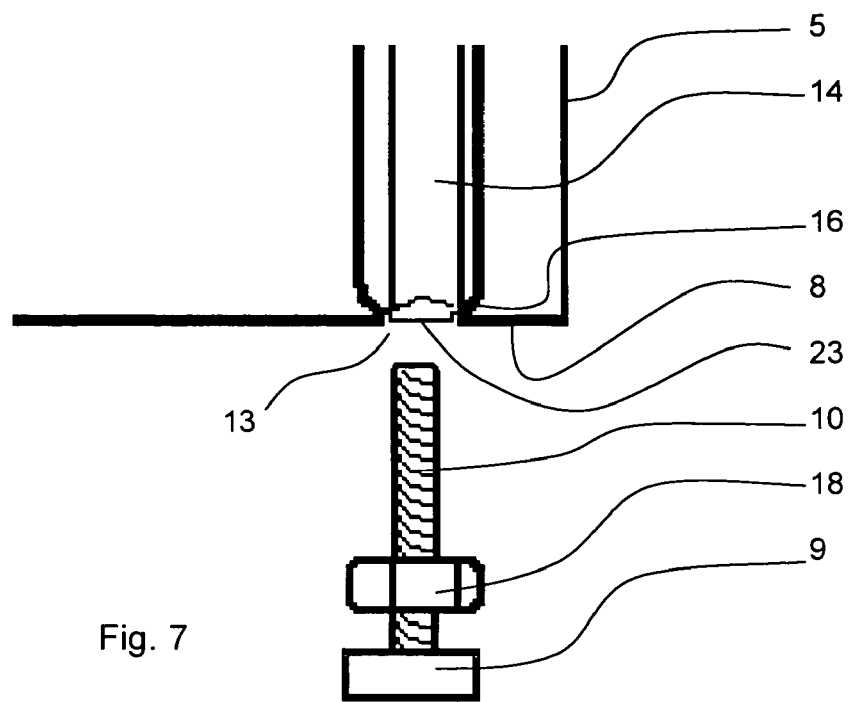
FIG. 7 shows a stud bolt with a shoulder in a detailed view.
Figure 8:
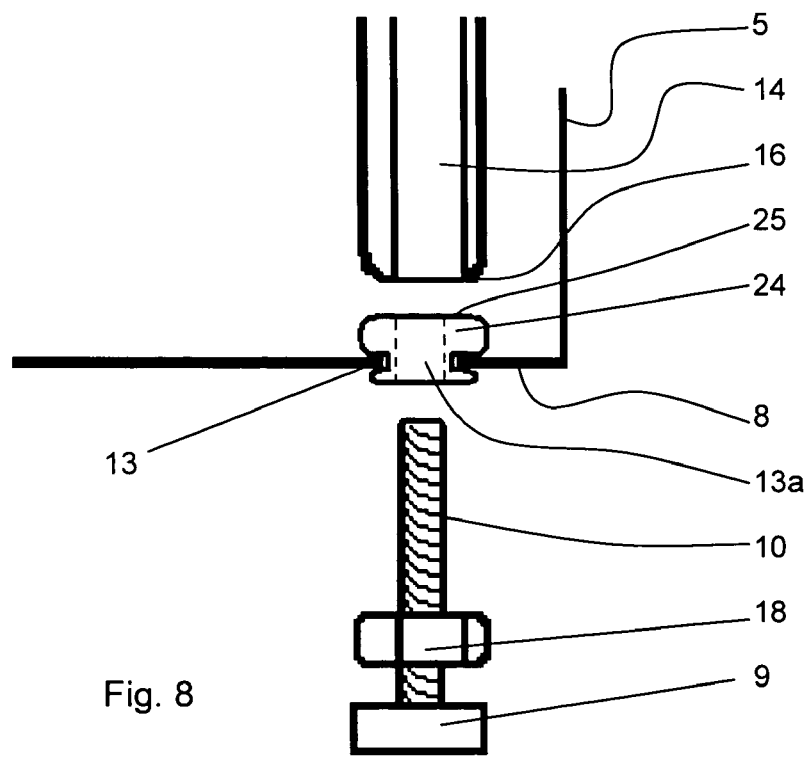
FIG. 8 shows the pedestal stand with a sleeve arranged in the bottom in a detailed view.

FIG. 7 shows a variant for a stud bolt 14 which has a shoulder 23 on its lower side 16. This shoulder 23 engages in the hole 13 in the bottom plate 8 so that the stud bolt 14 is held in its position, i.e., is secured with little lateral play. The shoulder 23 is designed so that its length dimension is such that it ends in the hole 13. This ensures that after screwing the bearing foot 9 into the stud bolt 14, the lock nut 18 can press the bottom plate 8 against the lower end 16 of the stud bolt 14. A reliable tight seating of the stud bolt 14 on the bottom plate 8 and the bearing foot 9 is achieved through this arrangement.

FIG. 4 shows the bottom plate 8 separately. The holes 13 are in the corner areas of the bottom plate 8. To reinforce the areas of the holes 13, the holes 13 are formed by sleeves 24 which are riveted and/or pressed into the bottom plate 8. In the sectional drawing according to FIG. 8, it can be seen that the sleeve 24 is riveted into the hole 13 in the bottom plate 8. The threaded stud bolt 10 of the bearing foot 9 is pushed through the through-bore 13a of the sleeve 24 and screwed into the threaded bore 17 at the lower end 16 of the stud bolt 14. After tightening the lock nut 18, the lower end 16 of the stud bolt 14 is pressed against the supporting surface 25 of the sleeve 24. The sleeves are preferably used for all holes 13 in the bottom plate. The use of sleeves 24 is also possible in the supporting plate 6 if this is expedient because of possible friction or trembling movements.

What is claimed is:

1. A pedestal stand for a laundry treatment machine, the pedestal stand having a housing which comprises a supporting plate, side walls, a front frame, a rear wall and a bottom plate wherein the supporting plate has openings into which threaded bolts attached to the underside of the laundry treatment machine can be inserted and screwed down, the pedestal stand comprising a plurality of stud bolts arranged inside the housing on an essentially vertical axis between the openings in the supporting plate and bearing feet on a bottom of the housing, at least one of the stud bolts being rotatable inside the housing and comprising a threaded bore on its upper end for accepting and engaging with a threaded bolt of the laundry treatment machine.

2. A pedestal stand according to claim 1, wherein at least one of the stud bolts has on its lower end a threaded bore, and the corresponding bearing foot has a threaded bolt directed upward, and the threaded bolt passes through an opening in the bottom plate of the pedestal stand and is screwed into the threaded bore at the lower end of the stud bolt.

3. A pedestal stand according to claim 1, wherein the stud bolt has a square or hexagonal shape in at least an axial section on its outside circumference.

4. A pedestal stand according to claim 2, wherein the stud bolt has a square or hexagonal shape in at least an axial section on its outside circumference.

5. A pedestal stand according to claim 1, wherein the stud bolt is made of a solid material whereby the threaded bores are designed as blind holes so that they end in the solid material.

6. A pedestal stand according to claim 2, wherein the stud bolt is made of a solid material whereby the threaded bores are designed as blind holes so that they end in the material.

7. A pedestal stand according to claim 3, wherein the stud bolt is made of a solid material whereby the threaded bores are designed as blind holes so that they end in the material.

8. A pedestal stand according to claim 1, wherein the stud bolt is made of a pipe and the threaded bores are formed from threaded sleeves or lock nuts inserted into the ends of the pipe.

9. A pedestal stand according to claim 2, wherein the stud bolt is made of a pipe and the threaded bores are formed from threaded sleeves or lock nuts inserted into the ends of the pipe.

10. A pedestal stand according to claim 3, wherein the stud bolt is made of a pipe and the threaded bores are formed from threaded sleeves or lock nuts inserted into the ends of the pipe.

11. A pedestal stand according to claim 1, wherein at least one stud bolt has a shoulder on its lower end, the shoulder being inserted into an opening in the bottom plate.

12. A pedestal stand according to claim 1, wherein the stud bolt has a shoulder on its lower end, the shoulder being inserted into an opening in the bottom plate.

13. A pedestal stand according to claim 2, wherein the stud bolt has a shoulder on its lower end, the shoulder being inserted into an opening in the bottom plate.

14. A pedestal stand according to claim 3, wherein the stud bolt has a shoulder on its lower end, the shoulder being inserted into an opening in the bottom plate.

15. A pedestal stand according to claim 5, wherein the stud bolt has a shoulder on its lower end, the shoulder being inserted into an opening in the bottom plate.

16. A pedestal stand according to claim 8, wherein the stud bolt has a shoulder on its lower end, the shoulder being inserted into the opening in the bottom plate.

17. A pedestal stand according to claim 1, wherein sleeves are inserted into the openings in the bottom plate or into the openings in the supporting plate, the sleeves forming a through-bore for the threaded bolt, and stud bolts are in contact with a supporting surface of the sleeves.

18. A pedestal stand according to claim 1, wherein at least one sleeve is inserted into the opening in the bottom plate or into the opening in the supporting plate, the sleeve forming a through-bore for one of the threaded bolts, and the stud bolt is in contact with a supporting surface of the sleeve.

19. A pedestal stand according to claim 2, wherein at least one sleeve is inserted into the opening in the bottom plate or into the opening in the supporting plate, the sleeve forming a through-bore for one of the threaded bolts, and the stud bolt is in contact with a supporting surface of the sleeve.

20. A pedestal stand according to claim 1, wherein the frame comprises an opening closable by a flap or a drawer such that the housing forms an enclosure closable by the flap or drawer.

* * * * *